June 11, 1935.　　　　F. HARVEY　　　　2,004,527
ELECTRICAL CONDUCTING SYSTEM
Filed July 31, 1933　　　2 Sheets-Sheet 1
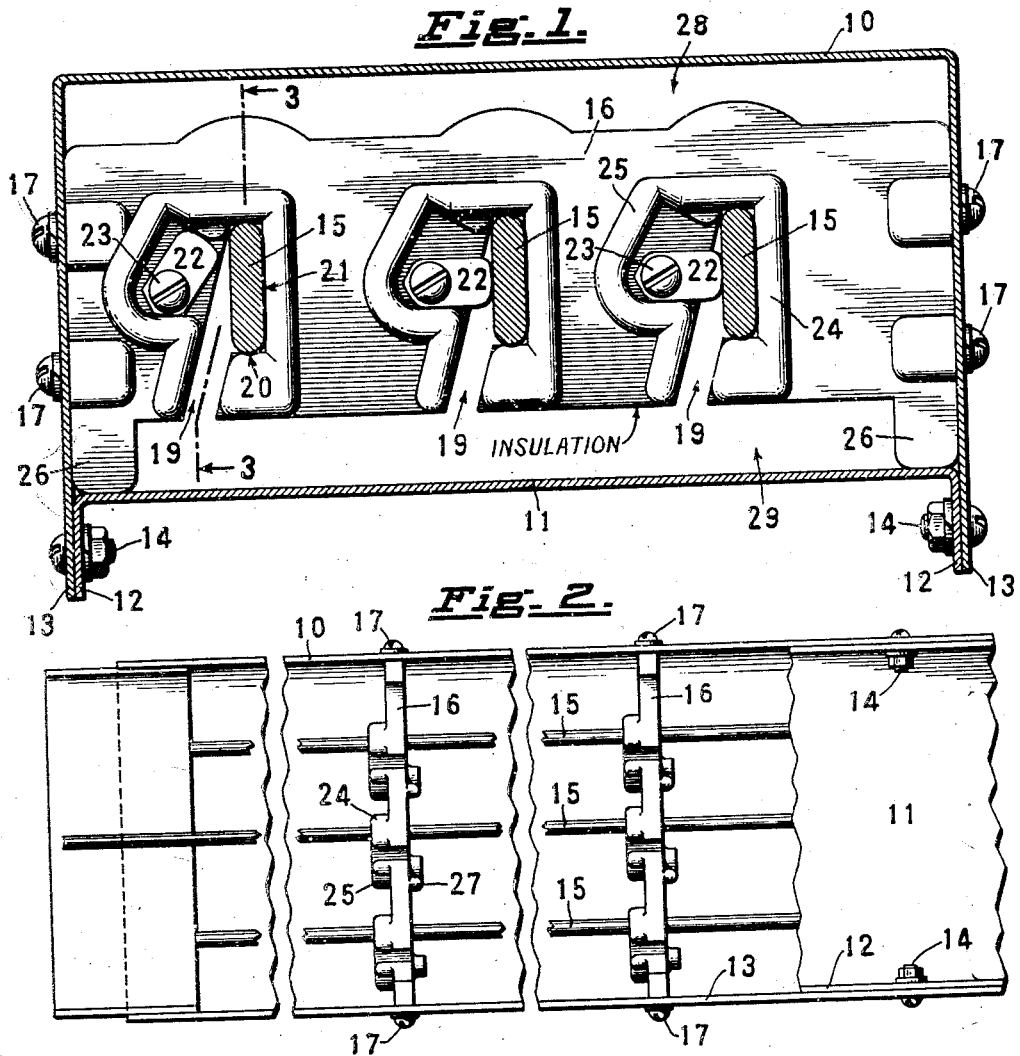
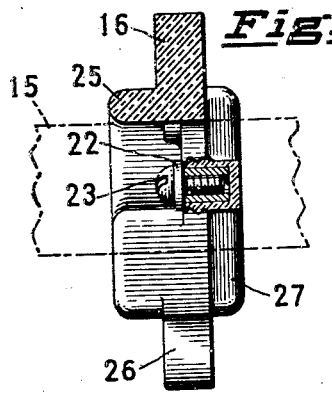
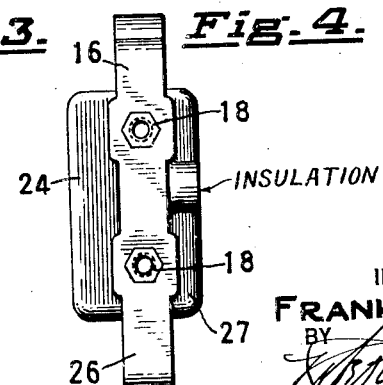
INVENTOR
FRANK HARVEY,
BY
ATTORNEY

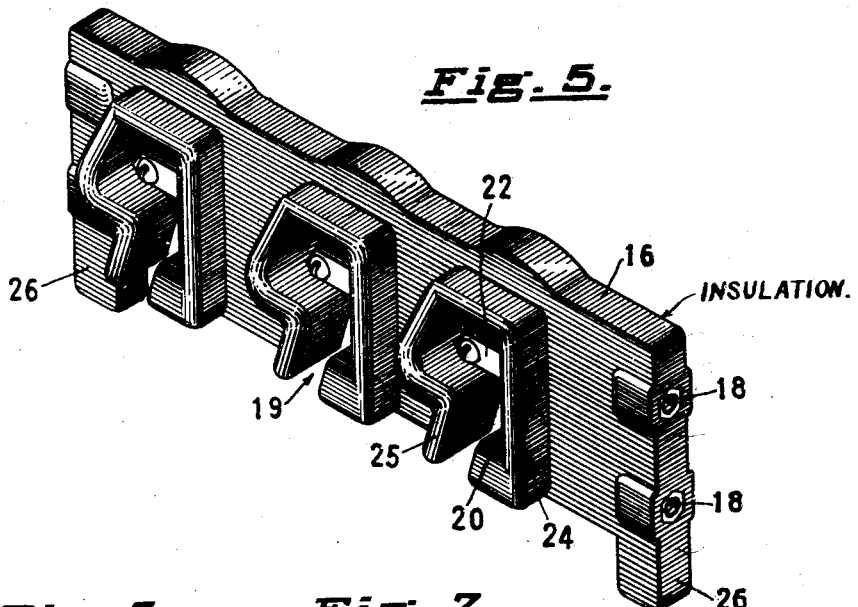
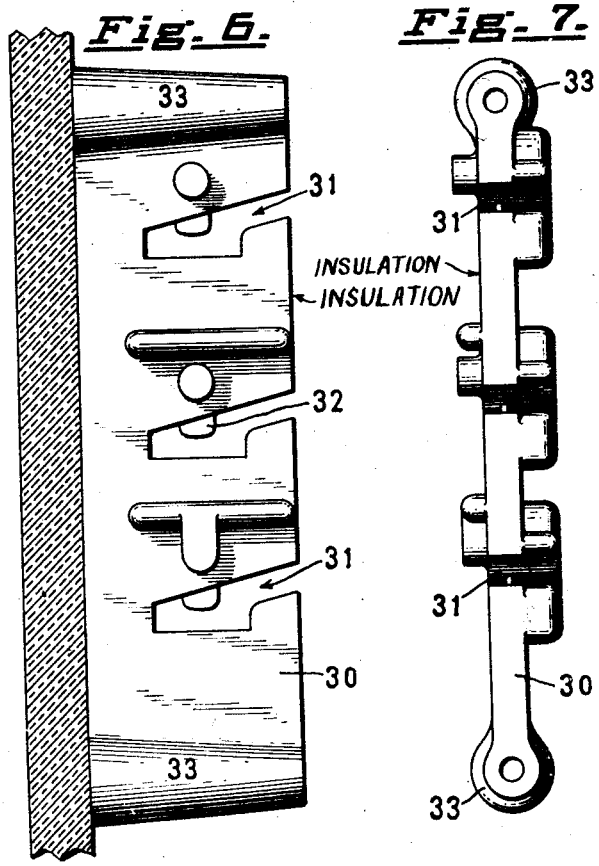

Patented June 11, 1935

2,004,527

UNITED STATES PATENT OFFICE 2,004,527

ELECTRICAL CONDUCTING SYSTEM

Frank Harvey, Covington, Ky., assignor to The Trumbull Electric Manufacturing Company, Plainville, Conn., a corporation of Connecticut Application July 31, 1933, Serial No. 682,998

5 Claims. (Cl. 247—36)

My invention relates particularly to what is sometimes termed a bus bar system of power distribution. Such constructions include the use of metallic trough-like conduits or housings in which are enclosed and mounted solid bars of copper, aluminum or other suitable metallic conductors.

The main object of the invention is to provide a construction of this character in which the conducting bars may be readily installed or removed from the front or openable side of the conduit.

Another object is to provide a simple and dependable method of supporting bus bars in predetermined fixed relation to each other.

Another object is to provide a one-piece support for a series of spaced bus bars.

Another object is to provide a bus bar support or mounting which is rugged and which will ensure the correct and equal spacing of the respective bars.

Another object is to provide a bus bar support or mounting which can be readily positioned in a trough-like housing or conduit either before or after the conduit is installed.

In the construction shown the conduit consists of a trough-like main housing open at one face and provided with a closure plate having flanges adapted to be readily secured to the flanges of the body portion of the housing.

The supports or carriers for the bus bars are formed of molded insulation with slots open at one edge for the reception of the respective bus bars and clamping devices are adapted to be moved into position to individually hold the respective bus bars in place. Some of the advantages of the invention are also applicable to supports for bus bars which need not be enclosed.

Fig. 1 is a transverse sectional view of a conduit with a bus bar carrier shown in place.

Fig. 2 is an interior view on a smaller scale showing the housing or trough-like conduit with two carriers and three bus bars in place.

Fig. 3 is a transverse sectional view of one of the carriers on the plane of the line 3—3 of Fig. 1.

Fig. 4 is an end view of one of the carriers.

Fig. 5 is a perspective view of one of the carriers.

Figs. 6 and 7 are side and edge views, respectively, showing a modified form of carrier.

The housing consists of a main body portion 10 open at one face and adapted to be closed by plate 11 which has flanges adapted to be connected to the flanges 13 of the body by means, for instance, of clamp bolts 14. The bus bars 15 may be of any suitable character and the invention may be applied to systems embodying one or more bus bars.

At intervals in the housing are mounted a number of cross bars 16 formed, for instance, of moulded insulating material and held in place by screws 17 which pass through the walls of the housing into screw seats 18 in the ends of the cross bars. Each cross bar is provided with a number of slots 19 opening at one edge and preferably inclined, as shown in Fig. 1. The inner walls of each slot are provided with supporting shoulders 20 and 21 and opposite the latter shoulder is mounted a clamping member or dog 22 which is supported by a screw 23 seated in the cross bar in such a way that the dog may be clamped in place in the position shown at the left of Fig. 1 where it is free from the bus bar to facilitate insertion and removal of the bus bar. By releasing the screw 23 and tilting the dog 22 into a horizontal position as shown in the center of Fig. 1 and then tightening the screw 23, the adjacent bus bar can be rigidly clamped in position.

I also preferably provide insulating flanges such as 24, 25 to reinforce the insulating material and also to afford greater electrical protection of each bus bar from the adjacent bus bars and the housing. A reinforcing and protecting flange 27 may be provided on the opposite side of the cross bar adjacent each bus bar.

I also provide lugs 26, 26 which serve to assist in supporting the cross bar in the housing when the bottom or face plate 11 is in place.

It will be seen from the foregoing that the cross bars or carriers may be readily inserted into and removed from the housing and that the bus bars may also be readily inserted and removed and that when the bus bars are in place they are held in definitely fixed relations with respect to each other and with respect to the housing. The construction also permits of free circulation of air all around the bus bars and in the spaces 28 and 29 above and below the cross bars respectively.

In the form of carrier shown in Figs. 6 and 7, the main body 30 is formed of insulating material with slots 31 adapted to receive the bus bars which are adapted to be clamped in place by the dogs 32, as previously described. In this case the ends of the carrier are provided with enlargements 33 adapted to receive supporting bolts or screws. Such a device may conveniently be mounted on a side wall or upon a panel or other vertical support and provides many of the advantages of the construction previously described.

I claim:

1. A bus bar support including an insulating cross bar adapted to be secured in a metal conduit and having a plurality of angular slots opening in one edge of the cross bar for receiving bus bars and each of said slots terminating in a recess having a relatively vertical side wall and a shoulder and a clamping device adjacent each of said vertical side walls for clamping the bus bar located therein against said side walls and definitely positioned with respect to said shoulder, said bar having means at each end for connection to said metal conduit.

2. A conduit for electrical bus bars including a metal conduit, a plurality of insulating spacing members in said conduit and extending across the interior of said conduit, each of said members having a plurality of open ended slots therein for receiving bus bars, each of said slots extending in an angular direction with respect to the vertical center line of said conduit and each of said slots terminating in an open sided recess of approximately the same cross sectional dimensions as the bus bar to be mounted therein, one side of each recess having a flat wall extending in a line parallel with the vertical side walls of said conduit and a clamping cam member carried by said spacing member for detachably securing and definitely positioning a portion of a bus bar in each of the respective recesses and for preventing movement of said bus bar in any direction when adjusted for service.

3. A bus bar support formed of insulating material in the form of a bar adapted to be supported crosswise in a channel-like metallic conduit, said support having slots opening in the edge facing toward the open face of the conduit to permit the bus bars to be inserted edgewise into the slots in the support when the support is mounted in the conduit, said support having a recess offset at one side of each slot with a vertical wall and abutment walls for the two edges of the inserted bus bar and a clamp arranged opposite each recess to detachably hold the inserted bus bar in place.

4. An elongated supporting member of insulating material for bus bars, said member having a number of slots opening at one edge of the member and inclined relative to the longitudinal edge of the member and recesses each having a wall at right angles to the slotted edge of the insulating member and connected with one of the slots and a clamping lug hinged to the supporting member adjacent one edge of each slot with its tip adapted to swing toward the adjacent recess to clamp a bus bar inserted into the recess through the slot and means at opposite ends of the supporting member for mounting it in a sheet metal conduit.

5. An insulating supporting bar for parallel flat bus bars, said supporting bar having slots opening in its lower edge and a recess at one side of the inner edge of each slot for receiving a flat bus bar extending at right angles to the edges of the supporting bar and clamping lugs hinged to the supporting bar to swing on axes parallel with the length of the bus bars and movable alongside the recesses and adapted to swing upwardly to permit the bus bar to be inserted edgewise in the slots and adapted to swing downwardly against the sides of the bus bars to hold them in place in the respective recesses.

FRANK HARVEY.